(12) United States Patent
Yageta

(10) Patent No.: US 11,015,700 B2
(45) Date of Patent: May 25, 2021

(54) LUBRICATING STRUCTURE FOR TRANSMISSION

(71) Applicant: HONDA MOTOR CO., LTD., Tokyo (JP)

(72) Inventor: Tomoaki Yageta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 15/987,929

(22) Filed: May 24, 2018

(65) Prior Publication Data

US 2018/0340604 A1    Nov. 29, 2018

(30) Foreign Application Priority Data

May 29, 2017    (JP) .............................. JP2017-105663

(51) Int. Cl.
*F16H 57/04*    (2010.01)
*F16H 48/12*    (2012.01)

(52) U.S. Cl.
CPC ....... *F16H 57/0424* (2013.01); *F16H 57/048* (2013.01); *F16H 57/0471* (2013.01); *F16H 48/12* (2013.01)

(58) Field of Classification Search
CPC ... F16H 57/0423; F16H 57/0471; F16H 48/12
USPC ...................................................... 184/6.12
See application file for complete search history.

(56) References Cited

U.S. PATENT DOCUMENTS

| 4,231,266 | A  | * | 11/1980 | Nishikawa | .......... | F16C 33/6659 |
|           |    |   |         |           |            | 184/11.1 |
| 8,840,511 | B2 | * | 9/2014  | Seno      | ...................... | F16H 57/045 |
|           |    |   |         |           |            | 475/159 |
| 8,931,596 | B2 | * | 1/2015  | Shioiri   | ................ | F16H 57/0423 |
|           |    |   |         |           |            | 184/6.12 |
| 9,103,432 | B2 | * | 8/2015  | Isomura   | .............. | F16H 57/0423 |
| 2006/0278475 | A1 | * | 12/2006 | Takahashi | ........... | F16H 57/0494 |
|           |    |   |         |           |            | 184/6.12 |
| 2009/0023531 | A1 | * | 1/2009  | Hilker    | ................. | F16H 57/0483 |
|           |    |   |         |           |            | 475/160 |
| 2009/0186737 | A1 | * | 7/2009  | Matsumoto | ......... | F16H 57/0483 |
|           |    |   |         |           |            | 475/160 |

(Continued)

FOREIGN PATENT DOCUMENTS

| EP | 1544510 | 6/2005 |
| JP | 58-141925 | 8/1983 |

(Continued)

OTHER PUBLICATIONS

Japanese Office Action for Japanese Patent Application No. 2017-105663 dated May 21, 2019.

(Continued)

*Primary Examiner* — Michael R Mansen
*Assistant Examiner* — Mark K Buse
(74) *Attorney, Agent, or Firm* — Amin, Turocy & Watson, LLP

(57) ABSTRACT

In a lubricating structure for a transmission, a case rib for stopping oil that is scooped up by a final driven gear is disposed on an inner surface of a first transmission case. The case rib is disposed above a location of a lower side portion of the final driven gear, which is immersed in the oil accumulated below the first transmission case, and at a position above a differential device and a drive shaft.

7 Claims, 4 Drawing Sheets

(56) References Cited

U.S. PATENT DOCUMENTS

| | | | |
|---|---|---|---|
| 2010/0083792 A1* | 4/2010 | Ariga | F16H 57/0471 |
| | | | 74/606 R |
| 2010/0105513 A1* | 4/2010 | Hilker | F16H 57/0483 |
| | | | 475/160 |
| 2012/0145483 A1* | 6/2012 | Araki | F16H 57/0423 |
| | | | 184/6.12 |
| 2015/0152954 A1* | 6/2015 | Kajikawa | F16H 57/0457 |
| | | | 475/150 |
| 2015/0219204 A1* | 8/2015 | Kruger | F16H 57/0409 |
| | | | 184/6.12 |
| 2016/0033029 A1* | 2/2016 | Gerstenberger | F16H 57/0483 |
| | | | 475/160 |
| 2016/0123455 A1* | 5/2016 | Mikami | F16H 57/045 |
| | | | 74/467 |
| 2016/0186855 A1* | 6/2016 | Tahara | F16H 57/0424 |
| | | | 74/413 |

FOREIGN PATENT DOCUMENTS

| | | |
|---|---|---|
| JP | 05-057502 | 7/1993 |
| JP | 2005-180577 | 7/2005 |
| JP | 2010-043677 | 2/2010 |
| JP | 2011-120417 | 6/2011 |

OTHER PUBLICATIONS

Japanese Office Action for Japanese Patent Application No. 2017-105663 dated Nov. 6, 2018.

* cited by examiner

REFERENCE EXAMPLE

000# LUBRICATING STRUCTURE FOR TRANSMISSION

CROSS-REFERENCE TO RELATED APPLICATION

This application is based upon and claims the benefit of priority from Japanese Patent Application No. 2017-105663 filed on May 29, 2017, the contents of which are incorporated herein by reference.

BACKGROUND OF THE INVENTION

Field of the Invention

The present invention relates to a lubricating structure for supplying oil that is scooped up by rotation of a gear in a transmission, to an object to be lubricated within the transmission.

Description of the Related Art

A lubricating structure for a vehicle transmission is disclosed, for example, in Japanese Laid-Open Patent Publication No. 2005-180577. In the aforementioned publication, in order to secure the oil necessary for lubricating the differential device, oil that is stored in the bottom portion of the transmission case is scooped up using the rotation of a final driven gear, and the scooped up oil is guided to the differential device via a groove or the like formed on an inner surface of the case.

SUMMARY OF THE INVENTION

However, if such scooped up oil becomes scattered on an upper portion in the interior of the case, it is difficult for the oil to fall onto the differential device, which is the object to be lubricated, and the amount of oil required for lubrication will be small. Hence, there is room for improvement.

The present invention has been devised with the aim of further improving the lubricating structure of the above-described publication, and has the object of providing a lubricating structure in which a greater amount of oil can be collected and supplied to an object to be lubricated.

The present invention is characterized by a lubricating structure for a transmission, and adapted to supply oil that is scooped up by rotation of a gear in the transmission, to an object to be lubricated within the transmission, the lubricating structure comprising a case rib disposed on an inner surface of a case of the transmission, and adapted to stop the oil that is scooped up. In this case, the case rib is disposed above a location of the gear, which is immersed in the oil accumulated in the case, and at a position above the object to be lubricated.

In accordance with such features, the scooped up oil is stopped by the case rib, and flows appropriately to the object to be lubricated which is disposed below the case rib. As a result, a greater amount of oil is collected and supplied to the object to be lubricated. Consequently, according to the present invention, with a simple configuration, it is possible to ensure an adequate amount of oil required for lubricating the object to be lubricated.

In this instance, the case rib is disposed on the inner surface of the case above the gear and the object to be lubricated, and in the vicinity of a range of rotation of the gear. In accordance therewith, it is possible to prevent the scooped up oil from scattering significantly above the gear, together with efficiently supplying the oil that is stopped by the case rib onto the lubrication target.

Further, the case rib is disposed on the inner surface of the case, at a location in the vicinity of a shaft arranged above the gear in the transmission. In accordance with this feature, the amount of oil that adheres to the shaft is reduced, and therefore, the occurrence of friction due to such adhered oil can be suppressed, and a pressure loss (loss of energy) due to the oil can be reduced.

Furthermore, if a substantially vertically extending gap is formed between the case rib and an outer edge portion of the case, oil that falls down from above the case rib can smoothly and effectively flow through the gap to the object to be lubricated.

Further still, by forming a groove around the periphery of the case rib on the inner surface of the case, the oil can flow through such a groove to the object to be lubricated. Consequently, a rectifying effect of the oil is enhanced, and a greater amount of oil can be supplied to the object to be lubricated.

Further, the lubricating structure may further include an oil supplying member disposed below the case rib on the inner surface of the case, and which is adapted to supply the oil that is stopped at least by the case rib and falls downward therefrom, to the object to be lubricated.

In this case, the oil supplying member is constituted by an oil leading rib disposed on the inner surface of the case, and adapted to guide the oil that falls downward from the case rib toward the object to be lubricated, and an oil guide plate arranged on the inner surface of the case so as to cover from above and without gaps an end portion of the oil leading rib, and adapted to collect the oil guided by the oil leading rib, and supply the oil to the object to be lubricated.

In accordance with these features, a greater amount of the scooped up oil can be collected by the oil guide plate via the oil leading rib, and the oil can be supplied to the object to be lubricated. Further, since the oil guide plate covers the end portion of the oil leading rib from above and without gaps, leakage of oil from a gap existing between the oil guide plate and the oil leading rib is suppressed. As a result, the oil collected in the oil guide plate can be reliably supplied to the object to be lubricated.

Furthermore, assuming that the oil guide plate is made of resin, it is possible to easily manufacture the oil guide plate without the presence of any gap between itself and the oil leading rib.

Further still, the gear is a final driven gear which is fixed to a differential device within the transmission, and the object to be lubricated is both the differential device, and a drive shaft connected to the differential device. In this case, the oil supplying member is disposed on the inner surface of the case above the drive shaft, and the oil guide plate supplies the collected oil to the differential device via an outer circumferential surface of the drive shaft.

In accordance therewith, it is possible to efficiently supply the collected oil to the drive shaft and the differential device. In particular, assuming that the oil is supplied to the outer circumferential surface of the drive shaft, the oil is supplied into the interior of the differential device via the outer circumferential surface of the drive shaft. As a result, seizure of a boundary point between the bearing, the side gear, and the pinion gear that constitute the differential device can be effectively avoided.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a lubricating structure for a transmission according to the present invention will be presented and described in detail below with reference to the accompanying drawings.

[1. Outline Configuration of the Present Embodiment]

Figure 1:
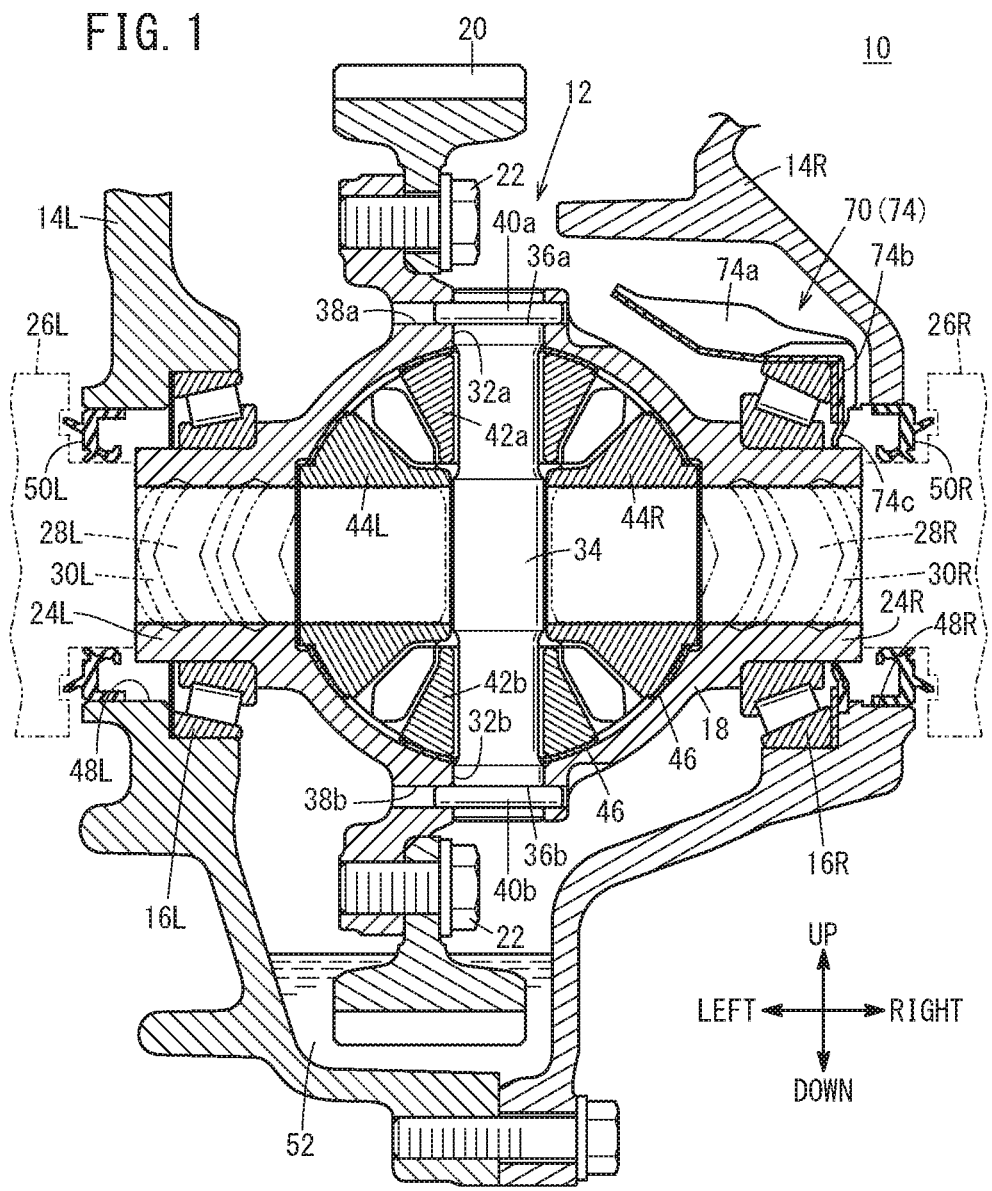
FIG. 1 is a partial cross-sectional view of a transmission to which a lubricating structure according to an embodiment of the present invention is applied.

FIG. 1 is a partial cross-sectional view of a transmission 10 to which a lubricating structure for a transmission according to the present embodiment (hereinafter referred to as a lubricating structure according to the present embodiment) is applied. In FIG. 1, the vicinity of a differential device 12 of the transmission 10 is illustrated in an enlarged manner. In addition, up and down directions, left and right directions, and front and rear directions are determined on the basis of a travel direction of a non-illustrated vehicle in which the transmission 10 is mounted.

In a lower portion of the transmission 10, the differential device 12 is accommodated (inside the transmission 10) between a first transmission case 14R which is provided on the right side and a second transmission case 14L which is provided on the left side. The differential device 12 includes a substantially spherical differential case 18, which is rotatably supported between the first transmission case 14R and the second transmission case 14L via left and right bearings 16L, 16R.

In the differential case 18, a final driven gear 20 is fixed in a lateral direction (vehicle widthwise direction) by a plurality of bolts 22. The differential case 18 has cylindrically shaped inboard parts 24L, 24R that serve as a pair of boss members extending in the lateral direction. A shaft end portion 28L of a left side drive shaft 26L is rotatably inserted on an inner circumferential surface of the left side inboard part 24L. Further, a shaft end portion 28R of a right side drive shaft 26R is rotatably inserted on an inner circumferential surface of the right side inboard part 24R. The respective shaft end portions 28L, 28R are inserted into the interior of the differential case 18 via the inboard parts 24L, 24R. Further, spiral grooves 30L, 30R, which are formed in a helical shape toward the interior of the differential case 18, are disposed respectively on the outer circumferential surfaces of the shaft end portions 28L, 28R that face toward the inboard parts 24L, 24R.

A pair of holes 32a, 32b are formed in upper and lower portions of the differential case 18, respectively, along the vertical direction. A pinion shaft 34 is supported in a vertical direction inside the differential case 18. Opposite end portions of the pinion shaft 34 are inserted respectively into each of the holes 32a, 32b, and thus, the central portion thereof faces toward the left and right shaft end portions 28L, 28R.

Further, a pin hole 36a is formed in the lateral direction on an upper end portion of the pinion shaft 34, and a pin hole 38a is formed substantially coaxially with the pin hole 36a in an upper part of the differential case 18. A pin 40a is inserted respectively through each of the pin holes 36a, 38a. On the other hand, a pin hole 36b is formed in the lateral direction on a lower end portion of the pinion shaft 34, and a pin hole 38b is formed substantially coaxially with the pin hole 36b in a lower part of the differential case 18. A pin 40b is inserted respectively through each of the pin holes 36b, 38b. Consequently, the pinion shaft 34 is fixed in a non-rotatable and non-removable manner to the differential case 18.

Inside the differential case 18, on an upper side and a lower side of the pinion shaft 34, a pair of differential pinions 42a, 42b are supported in a rotatable manner about the axial direction of the pinion shaft 34. On the other hand, a pair of drive pinions 44L, 44R are spline-coupled respectively to distal end parts of the shaft end portions 28L, 28R that are inserted into the interior of the differential case 18. Each of the differential pinions 42a, 42b is enmeshed, respectively, with the pair of right and left drive pinions 44L, 44R.

A thrust washer 46 is interposed between the inner surface of the differential case 18, and each of the differential pinions 42a, 42b and each of the drive pinions 44L, 44R.

The space between the left side drive shaft 26L and the second transmission case 14L is sealed by an oil seal 50L, in an opening hole 48L of the second transmission case 14L through which the left side drive shaft 26L is inserted. Further, the space between the right side drive shaft 26R and the first transmission case 14R is sealed by an oil seal 50R, in an opening hole 48R of the first transmission case 14R through which the right side drive shaft 26R is inserted.

Oil 52 for the purpose of lubricating the differential device 12 and the drive shafts 26L, 26R as objects to be lubricated is accumulated in the bottom portion of the transmission 10 (which is constituted by the first transmission case 14R and the second transmission case 14L). In this case, a portion (lower portion) of the final driven gear 20 is immersed in the oil 52, and the final driven gear 20 is rotated about the drive shafts 26L, 26R, whereby the oil 52 that is accumulated in the bottom portion of the transmission 10 is scooped upward.

[2. Characteristic Structures of the Present Embodiment]

With the lubricating structure according to the present embodiment, in order to supply the scooped up oil 52 to the differential device 12 and the drive shaft 26R and lubricate the differential device 12 and the drive shaft 26R, the following constituent features are applied to the transmission 10 (the inner surface (on the side of the differential device 12) of the first transmission case 14R). In this instance, the configuration of the lubricating structure will be described with reference to FIGS. 1 to 3B.

Figure 2:
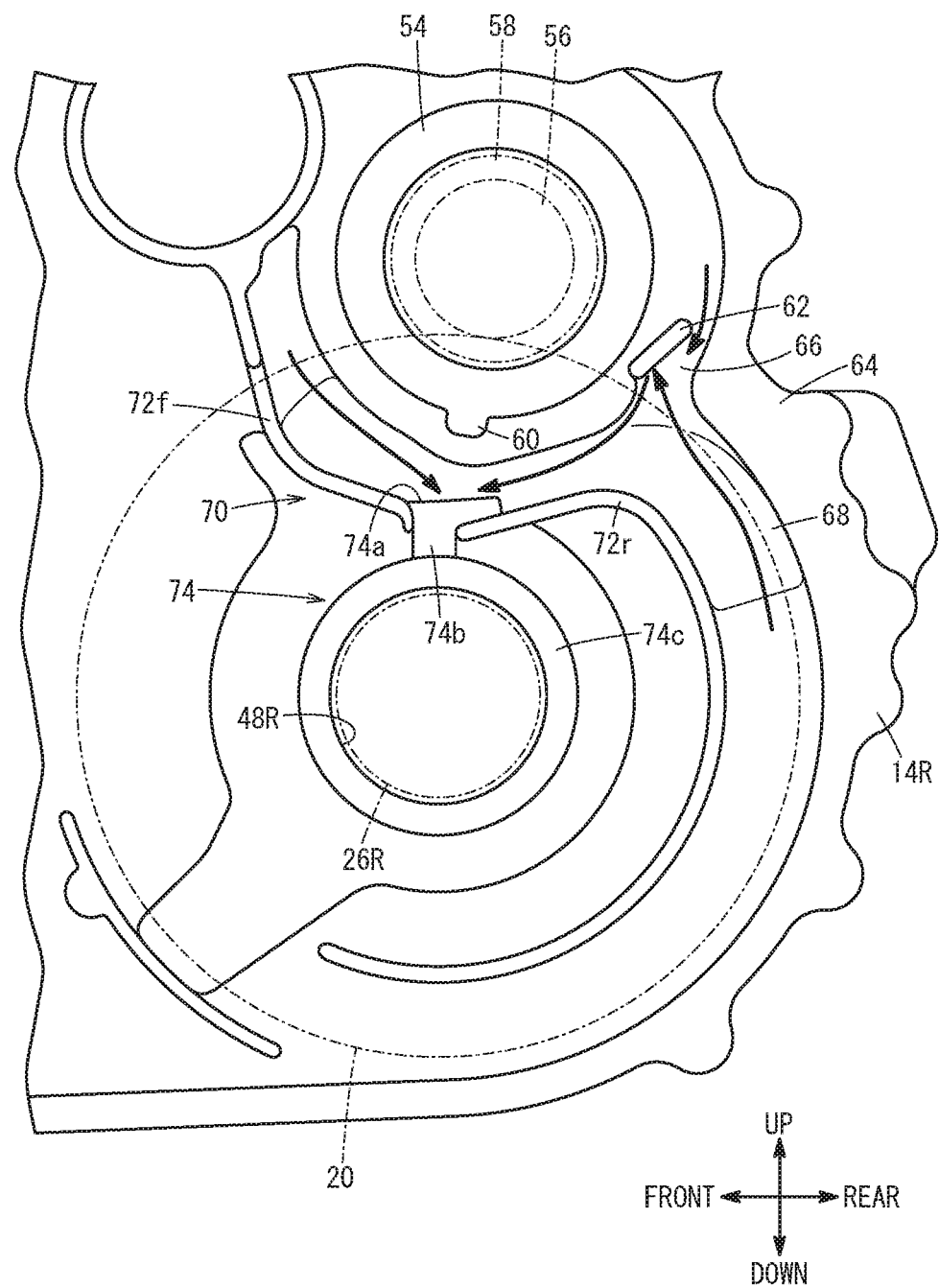
FIG. 2 is a partial side view illustrating an inner side surface of a first transmission case.

FIG. 2 is a partial side view illustrating an inner surface of the first transmission case 14R. On the inner surface, a cylindrical boss member 54 is formed above the opening hole 48R. A bearing 58, which pivotally supports a counter shaft 56 of the transmission 10, is disposed inside the boss member 54. The final driven gear 20 is enmeshed with a non-illustrated final drive gear that is fixedly supported on the counter shaft 56. Further, in FIG. 2, the one-dot dashed line circle representing the final driven gear 20 indicates a range of rotation of the final driven gear 20. Furthermore, in FIG. 2, on the outer circumferential surface of the boss member 54, a protruding portion 60 is provided, which protrudes downward toward the opening hole 48R. The protruding portion 60 is provided in order to enable dust, which may become mixed within the boss member 54, the counter shaft 56, and the bearing 58 due to contamination or the like, to escape downward.

In addition, a case rib 62, which stops the oil 52 (see FIG. 1) that is scooped up by the final driven gear 20, is formed on the inner surface of the first transmission case 14R. The case rib 62 is disposed above a location of a lower side portion of the final driven gear 20, which is immersed in the oil 52 accumulated in the bottom portion of the first transmission case 14R and the second transmission case 14L, and is disposed above the differential device 12 and the drive shafts 26L, 26R (see FIG. 1).

More specifically, the case rib 62 is disposed on the inner surface of the first transmission case 14R above the final driven gear 20, the differential device 12, and the drive shafts 26L, 26R, and in the vicinity of the range of rotation of the final driven gear 20. Further, the case rib 62 is disposed on the inner surface, at a location in the vicinity of (the boss member 54 in which there is disposed) the counter shaft 56 and the bearing 58, which are arranged above the final driven gear 20.

Figure 3A:
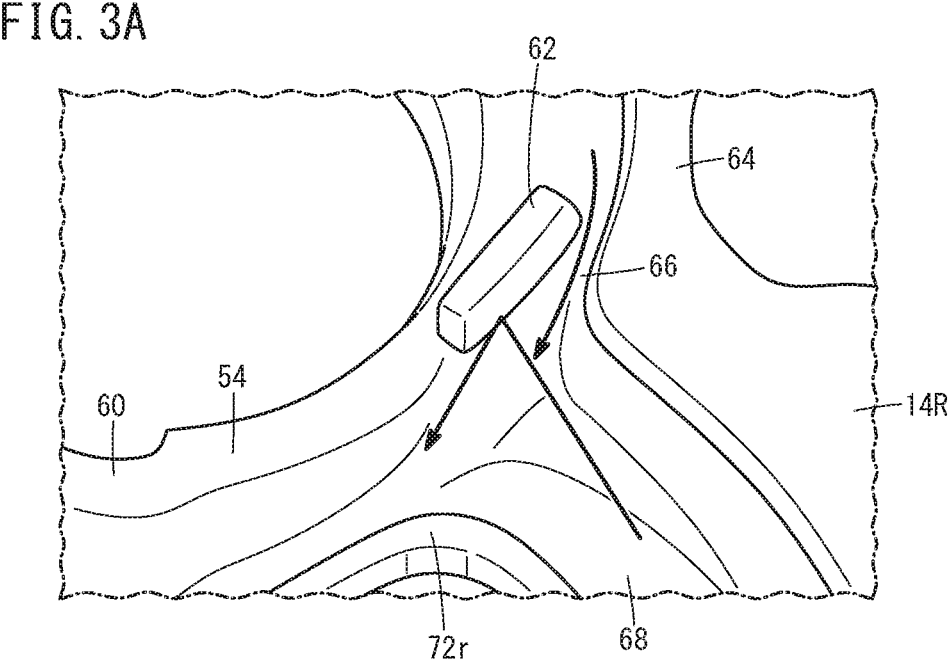
FIG. 3A and FIG. 3B are partial perspective views in which enlarged depictions of a case rib are shown.
Figure 3B:
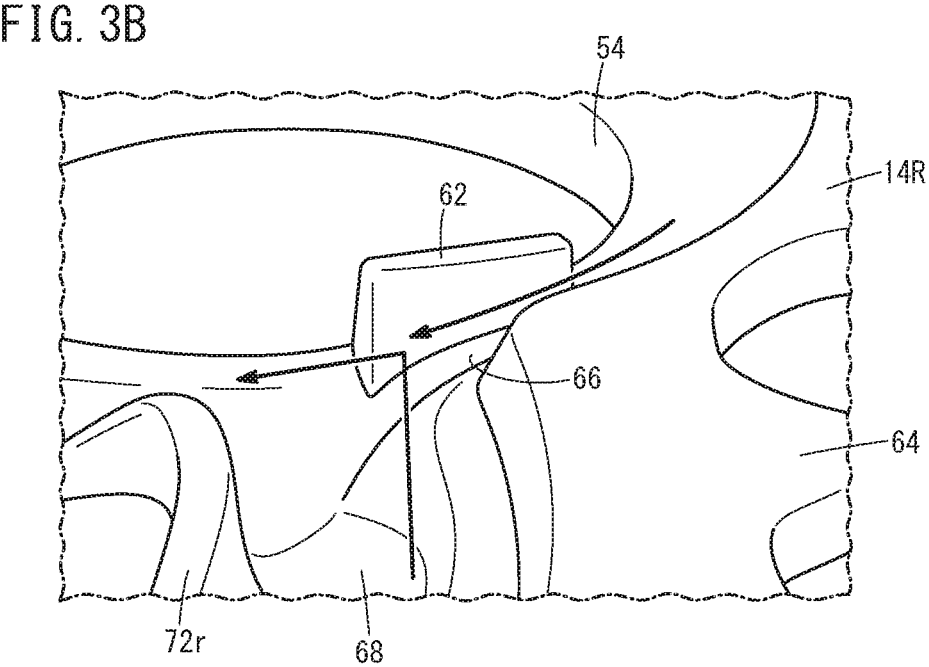

As shown in FIGS. 2 to 3B, the case rib 62 is erected from the inner surface of the first transmission case 14R toward the interior (in the leftward direction of FIG. 1) of the transmission 10, and a substantially vertically extending gap 66 is formed between the case rib 62 and an outer edge portion 64 of the first transmission case 14R. Furthermore, the periphery of the case rib 62 on the inner surface of the first transmission case 14R, and more specifically, the lower side portion of the case rib 62, is engraved toward the outside of the first transmission case 14R (in the rightward direction of FIG. 1), or is recessed to thereby form a groove 68. The groove 68 is a substantially L-shaped groove, which extends upwardly from the lower side of the case rib 62 along the outer edge portion 64 of the first transmission case 14R, bends in a forward direction in front of the case rib 62, and reaches a position above the opening hole 48R—in other words, reaches the protruding portion 60. The gap 66 is connected to the bent portion of the groove 68.

On the other hand, on the inner surface of the first transmission case 14R, on a more front lower side than the case rib 62, and at a location between the opening hole 48R and the (protruding portion 60 of the) boss member 54, an oil supplying member 70 is provided, which supplies the oil 52 that is stopped at least by the case rib 62 and falls downward therefrom, to the differential device 12 and the drive shaft 26R.

As shown in FIGS. 1 and 2, the oil supplying member 70 is constituted by oil leading ribs 72f, 72r which are provided on the inner surface and guide the oil 52 which falls downward at least from the case rib 62, and an oil guide plate 74 which is arranged on the inner surface so as to cover from above and without gaps the end portions of the oil leading ribs 72f, 72r and which collects the oil 52 guided by the oil leading ribs 72f, 72r and supplies the oil 52 to the differential device 12 and the drive shaft 26R.

The oil leading rib 72f, which is formed in a frontward portion of the inner surface, is a wall portion that is curved from the front of the boss member 54 toward the opening hole 48R. Further, the oil leading rib 72r, which is formed in a rearward portion of the inner surface, is a wall portion that extends in an arcuate shape from below to above along the outer edge portion 64, and further extends along the groove 68 toward the opening hole 48R. In this case, a gap is formed between the end portions of the two oil leading ribs 72f, 72r.

The oil guide plate 74 is made of resin, and is constituted from a collecting member 74a, which covers the end portions of the oil leading ribs 72f, 72r from above and without gaps, and collects the falling oil 52, a guide member 74b connected to the collecting member 74a and arranged in a manner so as to close the gap between the respective end portions of the oil leading ribs 72f, 72r, and a supply member 74c connected to the guide member 74b, and which is formed in a circular shape in surrounding relation to the outer circumferential surface of the inboard part 24R and the drive shaft 26R.

Moreover, as shown in FIG. 1, the collecting member 74a is disposed above the differential case 18, in a manner so as to incline slightly in the rightward direction from the final driven gear 20 toward the inner surface of the first transmission case 14R. Further, the guide member 74b and the supply member 74c are formed along the vertical direction.

[3. Operations of the Present Embodiment]

Next, operations of the lubricating structure according to the present embodiment will be described.

When the counter shaft 56 is rotated due to driving of the engine of a non-illustrated vehicle, and the final driven gear 20, which is enmeshed with the final drive gear that is fixedly supported on the counter shaft 56, rotates, the differential device 12 also rotates integrally about the axial direction of the drive shafts 26L, 26R. In this case, the lower side portion of the final driven gear 20 is immersed in the oil 52 that is accumulated in the bottom portion of the first transmission case 14R and the second transmission case 14L. Therefore, by rotation of the final driven gear 20, the oil 52 accumulated at the bottom portion is scooped upward.

As shown by the arrows in FIGS. 2A through 3B, the scooped up oil 52 is stopped by the case rib 62, and the stopped oil 52 flows through the gap 66 and the groove 68, and while being guided by the oil leading rib 72r, is directed onto the collecting member 74a of the oil guide plate 74 that makes up the oil supplying member 70. Moreover, among the oil 52 scattered upwardly of the case rib 62, the oil 52 that is scattered onto the rear side of the boss member 54 flows through the gap 66 and the groove 68, is guided by the oil leading rib 72r, and is led to the collecting member 74a. Further, the oil 52 that is scattered onto the front side of the boss member 54 is guided by the oil leading rib 72f, and is led to the collecting member 74a. Furthermore, since the protruding portion 60, which protrudes downwardly in a direction toward the collecting member 74a, is provided on the boss member 54, the oil 52 adhered to the boss member 54 and the like falls easily onto the collecting member 74a.

Since the collecting member 74a covers the end portions of the oil leading ribs 72f, 72r from above and without gaps, it is possible for the oil 52 that is guided by the oil leading ribs 72f, 72r, and the oil 52 that has fallen down from the protruding portion 60, to be collected. As shown in FIG. 1, because the collecting member 74a is slightly inclined in the rightward direction, the oil 52 accumulated in the collecting member 74a is supplied via the guide member 74b into a space defined by the oil seal 50R, the drive shaft 26R, and the bearing 16R, and is temporarily stored therein. The stored oil 52 is supplied via the circular supply member 74c to the outer circumferential surfaces of the inboard part 24R and the drive shaft 26R.

As discussed previously, since the differential device 12 and the drive shafts 26L, 26R are rotating, the supplied oil 52 is in turn supplied to the bearing 16R via the outer circumferential surface of the inboard part 24R. Consequently, the bearing 16R is lubricated.

Further, the supplied oil 52 is guided from the outer circumferential surface of the drive shaft 26R to the spiral groove 30R formed on the outer circumferential surface of the shaft end portion 28R, and is led therefrom to the interior of the differential case 18. Consequently, in FIG. 1, the location on the right side with respect to the pinion shaft 34 in the interior of the transmission 10, and more specifically, the drive shaft 26R and the right side portion inside the differential device 12 (the pinion shaft 34, the differential pinions 42a, 42b, the drive pinion 44R, and the thrust washer 46) are lubricated. Moreover, in the interior of the transmission 10, the location on the left side with respect to the pinion shaft 34 is lubricated by the oil supplied from a non-illustrated baffle plate or the like to the interior of the differential case 18 via the drive shaft 26L.

[4. Advantages and Effects of the Present Embodiment]

As was described above, in accordance with the lubricating structure for a transmission according to the present embodiment, the oil 52 that is scooped up by the final driven gear 20, is stopped by the case rib 62, and flows appropriately to the differential device 12 and the drive shaft 26R, objects to be lubricated, which are arranged below the case rib 62. As a result, a greater amount of the oil 52 is collected and supplied to the differential device 12 and the drive shaft 26R. Consequently, according to the present embodiment, with a simple configuration, it is possible to ensure an adequate amount of oil required for lubricating the right side of the differential device 12 and the drive shaft 26R.

Further, the case rib 62 is disposed on the inner surface of the first transmission case 14R above the final driven gear 20, the differential device 12, and the drive shafts 26L, 26R, and in the vicinity of a range of rotation of the final driven gear 20. In accordance therewith, it is possible to prevent the scooped up oil 52 from scattering significantly above the final driven gear 20, together with efficiently supplying the oil 52 that is stopped by the case rib 62 onto the differential device 12 and the drive shaft 26R.

Further, the case rib 62 is disposed on the inner surface of the first transmission case 14R, at a location in the vicinity of the counter shaft 56 and the bearing 58 which are arranged above the final driven gear 20 in the transmission 10. In accordance with this feature, the amount of oil that adheres to the counter shaft 56 and the bearing 58 is reduced, and therefore, the occurrence of friction due to such adhered oil 52 can be suppressed, and a pressure loss (loss of energy) due to the oil 52 can be reduced.

Furthermore, since the substantially vertically extending gap 66 is formed between the case rib 62 and the outer edge portion 64 of the first transmission case 14R, the oil 52 that falls down from above the case rib 62 can smoothly and effectively flow through the gap 66 to the differential device 12 and the drive shaft 26R.

Further still, by forming the groove 68 peripherally around the case rib 62 on the inner surface of the first transmission case 14R, the oil 52 can flow through the groove 68 to the differential device 12 and the drive shaft 26R. Consequently, a rectifying effect of the oil 52 is enhanced, and a greater amount of the oil 52 can be supplied to the differential device 12 and the drive shaft 26R.

Further, in the lubricating structure according to the present embodiment, the oil supplying member 70 is disposed below the case rib 62 on the inner surface of the first transmission case 14R, and is adapted to supply the oil 52 that is stopped at least by the case rib 62 and falls downward therefrom, to the differential device 12 and the drive shaft 26R.

In this case, the oil supplying member 70 is constituted by the oil leading ribs 72f, 72r that guide at least the oil 52 that falls downward from the case rib 62, and the oil guide plate 74, which is arranged on the inner surface of the first transmission case 14R so as to cover from above and without gaps the end portions of the oil leading ribs 72f, 72r, and which collects the oil 52 guided by the oil leading ribs 72f, 72r, and supplies the oil 52 to the differential device 12 and the drive shaft 26R.

In accordance with these features, a greater amount of the scooped up oil 52 can be collected by the oil guide plate 74 via the oil leading ribs 72f, 72r, and the oil 52 can be supplied to the differential device 12 and the drive shaft 26R.

Figure 4A:
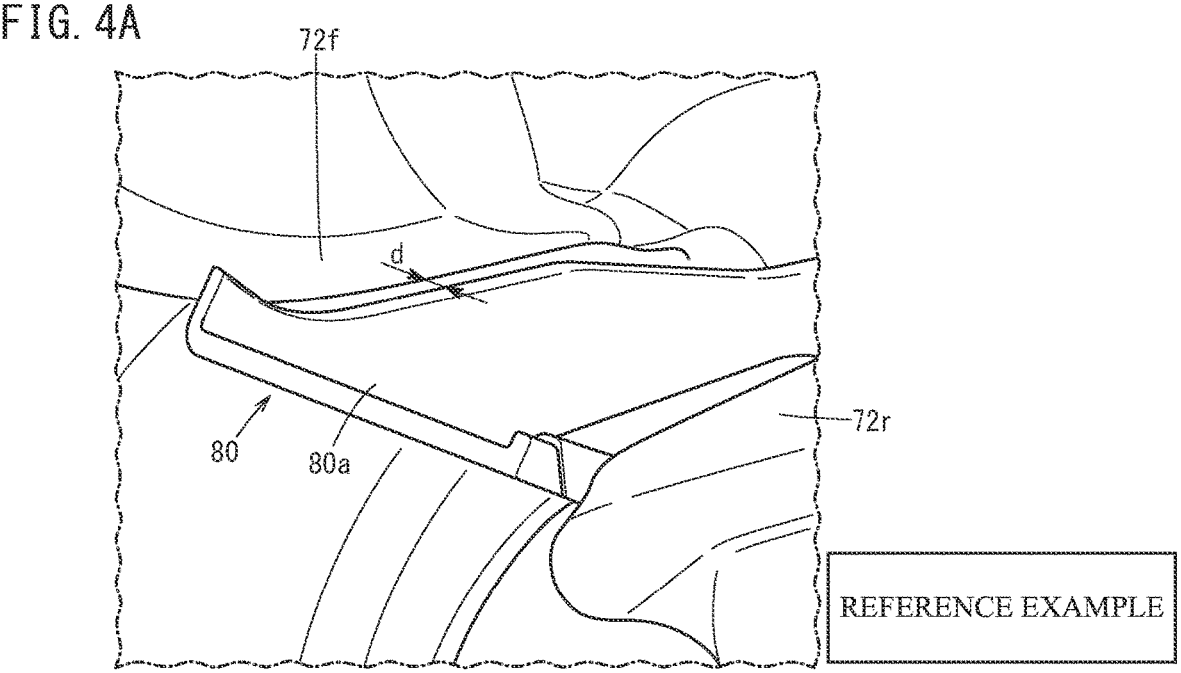
FIG. 4A is a perspective view of an oil guide plate according to a comparative example.

Further, as in the comparative example of FIG. 4A, if a gap d is formed between the oil leading ribs 72f, 72r and the (collecting member 80a of the) oil guide plate 80, the oil 52 disadvantageously leaks out through the gap d. As a result, it becomes impossible to ensure an adequate amount of oil required for lubricating the differential device 12 and the drive shaft 26R.

Figure 4B:
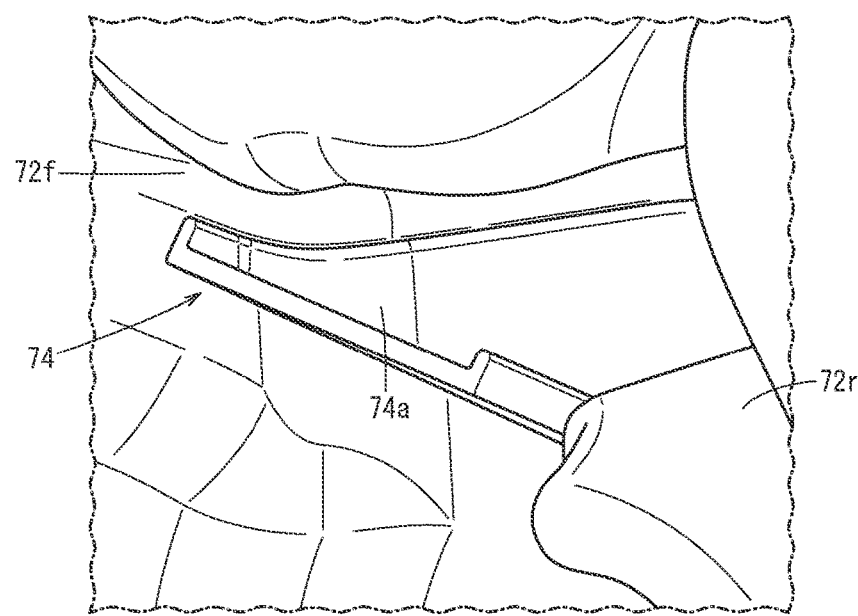
FIG. 4B is a perspective view of an oil guide plate according to the present embodiment.

In contrast thereto, with the lubricating structure according to the present embodiment, as shown in FIGS. 2 and 4B, the collecting member 74a of the oil guide plate 74 covers the end portions of the oil leading ribs 72f, 72r from above and without any gaps. Consequently, leakage of oil 52 from gaps between the collecting member 74a and the oil leading ribs 72f, 72r can be suppressed. As a result, it is possible to reliably supply the oil 52 collected in the oil guide plate 74 to the differential device 12 and the drive shaft 26R.

Furthermore, since the oil guide plate 74 is made of resin, it is possible to easily manufacture the oil guide plate 74 without the presence of any gaps between itself and the oil leading ribs 72f, 72r.

Further still, since the collected oil 52 can be efficiently supplied to the differential device 12 and the drive shaft 26R, assuming that the oil 52 is supplied to the outer circumferential surface of the drive shaft 26R, the oil 52 is supplied into the interior of the differential device 12 via the outer circumferential surface of the drive shaft 26R. As a result, seizure of a boundary point between the bearing 16R, the pinion shaft 34, the differential pinions 42a, 42b, the drive pinion 44R, and the thrust washer 46, which constitute the right side portion of the differential device 12, can be effectively avoided.

[5. Modifications of the Present Embodiment]

In the description given above, a case has been described in which the lubricating structure is constituted by both the case rib 62 and the oil supplying member 70. According to the present embodiment, it is also possible to provide only the case rib 62 or only the oil supplying member 70 on the inner surface of the transmission case 14. Even in this case, it goes without saying that the effects of providing the case rib 62, or the effects of providing the oil supplying member 70 can easily be obtained.

Further, in the description given above, a lubricating structure has been described for the purpose of lubricating the differential device 12 and the drive shaft 26R. According to the present embodiment, it is sufficient if the oil 52 that is scooped up by rotation of the gear inside the transmission 10 is capable of being supplied to an object to be lubricated within the transmission 10. Accordingly, the constituent elements of the transmission 10 other than the differential device 12 and the drive shaft 26R may serve as objects to be lubricated. Further, the present embodiment may also be applied to a case in which the oil 52 is scooped up by a gear other than the final driven gear 20. In any of such cases, the aforementioned effects can be obtained.

It should be understood that the present invention is not limited to the above-described embodiment, and various alternative or additional configurations could be adopted therein based on the disclosed content of the present specification.

What is claimed is:

1. A lubricating structure for a transmission adapted to supply oil that is scooped up by rotation of a gear in the transmission, to an object to be lubricated within the transmission, comprising:
   a case rib disposed on an inner surface of a case of the transmission, and allowing the oil that is scooped up to fall to the object to be lubricated; and
   an oil supplying member disposed below the case rib on the inner surface of the case, and which is adapted to supply at least the oil that is blocked by the case rib and falls downward therefrom, to the object to be lubricated;
   wherein the case rib is disposed above a location of the gear, which is immersed in the oil accumulated in the case, and at a position above the object to be lubricated,
   wherein the oil supplying member comprises:
   an oil leading rib disposed on the inner surface of the case, and adapted to guide at least the oil that falls downward from the case rib toward the object to be lubricated; and
   an oil guide plate arranged on the inner surface of the case so as to cover from above and without gaps an end portion of the oil leading rib, and adapted to collect the oil guided by the oil leading rib and supply the oil to the object to be lubricated.

2. The lubricating structure for a transmission according to claim 1, wherein the case rib is disposed on the inner surface of the case above the gear and the object to be lubricated, and in the vicinity of a range of rotation of the gear.

3. The lubricating structure for a transmission according to claim 1, wherein the case rib is disposed on the inner surface of the case, at a location in the vicinity of a shaft arranged above the gear in the transmission.

4. The lubricating structure for a transmission according to claim 1, wherein a substantially vertically extending gap is formed between the case rib and an outer edge portion of the case.

5. The lubricating structure for a transmission according to claim 1, wherein a groove is formed peripherally around the case rib on the inner surface of the case.

6. The lubricating structure for a transmission according to claim 1, wherein the oil guide plate is made of resin.

7. The lubricating structure for a transmission according to claim 1, wherein:
   the gear is a final driven gear fixed to a differential device within the transmission;
   the object to be lubricated is the differential device, and a drive shaft connected to the differential device;
   the oil supplying member is disposed on the inner surface of the case above the drive shaft; and
   the oil guide plate supplies the collected oil to the differential device via an outer circumferential surface of the drive shaft.

* * * * *